(12) United States Patent
Lyon

(10) Patent No.: US 6,920,531 B2
(45) Date of Patent: Jul. 19, 2005

(54) METHOD AND APPARATUS FOR UPDATING AND INVALIDATING STORE DATA

(75) Inventor: Terry L Lyon, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 37 days.

(21) Appl. No.: 10/699,666

(22) Filed: Nov. 4, 2003

(65) Prior Publication Data

US 2004/0162961 A1 Aug. 19, 2004

Related U.S. Application Data

(62) Division of application No. 10/230,188, filed on Aug. 29, 2002, now Pat. No. 6,772,316, which is a division of application No. 09/466,306, filed on Dec. 17, 1999, now Pat. No. 6,470,437.

(51) Int. Cl.[7] .............................................. G06F 12/10
(52) U.S. Cl. ..................... 711/138; 711/140; 711/206; 711/207
(58) Field of Search ........................ 711/108, 118–120, 711/133–134, 138, 140, 144–145, 206–207, 3, 156, 128, 168–169

(56) References Cited

U.S. PATENT DOCUMENTS

| | | | |
|---|---|---|---|
| 5,859,999 A | 1/1999 | Morris et al. ................ 712/224 |
| 5,860,017 A | 1/1999 | Sharangpani et al. ......... 712/23 |
| 6,014,732 A | * 1/2000 | Naffziger ..................... 711/203 |
| 6,272,597 B1 | * 8/2001 | Fu et al. ...................... 711/131 |
| 6,351,797 B1 | * 2/2002 | Beard et al. ................. 711/207 |

FOREIGN PATENT DOCUMENTS

EP    0 911 737 A1 * 4/1999

OTHER PUBLICATIONS

Wolfe, Alexander, "Patents Shed Light on Merced", Electronic Engineering Times, Feb. 15, 1999, pp. 43–44.

* cited by examiner

Primary Examiner—Denise Tran

(57) ABSTRACT

In a computer architecture using a prevalidated tag cache design, logic circuits are added to enable store and invalidation operations without impacting integer load data access times and to invalidate stale cache lines. The logic circuits include a translation lookaside buffer (TLB) architecture to handle store operations in parallel with a smaller, faster integer load TLB architecture. A store valid module, added to the TLB architecture, sets a valid bit when a new cache line is written. The valid bit is cleared on the occurrence of an invalidation operation. The valid bit prevents multiple store updates or invalidates for cache lines that are already invalid.

15 Claims, 8 Drawing Sheets

METHOD AND APPARATUS FOR UPDATING AND INVALIDATING STORE DATA

CROSS REFERENCE TO RELATED APPLICATION(S)

This is a divisional of a application Ser. No. 10/230,188, entitled "METHOD AND APPARATUS FOR UPDATING AND INVALIDATING STORE DATA," filed on Aug. 29, 2002, now U.S. Pat. No. 6,772,316, which in turn is a divisional of application Ser. No. 09/466,306 filed Dec. 17, 1999 entitled "UPDATING AND INVALIDATING STORE DATA AND REMOVING STALE CACHE LINES IN A PREVALIDATED TAG CACHE DESIGN," now U.S. Pat. No. 6,470,437. These applications and the patent are hereby incorporated by reference.

TECHNICAL FIELD

The technical field encompasses computer systems employing prevalidated cache tag designs. In particular, the technical field encompasses designs to support store updates and invalidates and removal of stale cache lines out of a cache.

BACKGROUND

Computer systems may employ a multi-level hierarchy of memory, with relatively fast, expensive but limited-capacity memory at the highest level of the hierarchy and proceeding to relatively slower, lower cost but higher-capacity memory at the lowest level of the hierarchy. The hierarchy may include a small fast memory called a cache, either physically integrated within a processor or mounted physically close to the processor for speed. The computer system may employ separate instruction caches and data caches. In addition, the computer system may use multiple levels of caches. The use of a cache is transparent to a computer program at the instruction level and can thus be added to a computer architecture without changing the instruction set or requiring modification to existing programs.

A cache hit occurs when a processor requests an item from a cache and the item is present in the cache. A cache miss occurs when a processor requests an item from a cache and the item is not present in the cache. In the event of a cache miss, the processor retrieves the requested item from a lower level of the memory hierarchy. In many processor designs, the time required to access an item for a cache hit is one of the primary limiters for the clock rate of the processor if the designer is seeking a single cycle cache access time. In other designs, the cache access time may be multiple cycles, but the performance of a processor can be improved in most cases when the cache access time in cycles is reduced. Therefore, optimization of access time for cache hits is critical for the performance of the computer system.

Associated with cache design is a concept of virtual storage. Virtual storage systems permit a computer programmer to think of memory as one uniform single-level storage unit but actually provide a dynamic address-translation unit that automatically moves program blocks on pages between auxiliary storage and the high speed storage (cache) on demand.

Also associated with cache design is the concept of fully associative or content-addressable memory (CAM). Content-addressable memory is a random access memory that in addition to having a conventional wired-in addressing mechanism also has wired-in logic that makes possible a comparison of desired bit locations for a specified match for all entries simultaneously during one memory-cycle time. The specific address of a desired entry need not be known since a portion of its contents can be used to access the entry. All entries that match the specified bit locations are flagged and can be addressed the current or on subsequent memory cycles.

Memory may be organized into words (for example 32 bits or 64 bits per word). The minimum amount of memory that can be transferred between a cache and the next lower level of memory hierarchy is called a line or a block. A line may be multiple words (for example, 16 words per line). Memory may also be divided into pages or segments with many lines per page. In some computer systems page size may be variable.

In modern computer memory architectures, a central processing unit (CPU) produces virtual addresses that are translated by a combination of hardware and software to physical addresses. The physical addresses are used to access physical main memory. A group of virtual addresses may be dynamically assigned to each page. Virtual memory requires a data structure, sometimes called a page table, that translates the virtual address to the physical address. To reduce address translation time, computers may use a specialized associative cache dedicated to address location, called a translation lookaside buffer (TLB).

A cache may include many segments, or ways. If a cache stores an entire line address along with the data and any line can be placed anywhere in the cache, the cache is said to be fully associative. For a large cache in which any line can be placed anywhere, the hardware required to rapidly determine if and where an item is in the cache may be very large and expensive. For larger caches a faster, space saving alternative is to use a subset of an address (called an index) to designate a line position within the cache, and then store the remaining set of the more significant bits of each physical address, called a tag, along with the data. In a cache with indexing, an item with a particular address can be placed only within a set of lines designated by the index. If the cache is arranged so that the index for a given address maps exactly to one line in the subset, the cache is said to be direct mapped. If the index maps to more than one line in the subset, or way, the cache is said to be set-associative. All or part of an address may be hashed to provide a set index that partitions the address space into sets.

With direct mapping, when a line is requested, only one line in the cache has matching index bits. Therefore, the data can be retrieved immediately and driven onto a data bus before the computer system determines whether the rest of the address matches. The data may or may not be valid, but in the usual case where the data is valid, the data bits are available on the data bus before the computer system determines validity. With set associative caches, the computer system cannot know which line corresponds to an address until the full address is compared. That is, in set-associative caches, the result of tag comparison is used to select which line of data bits within a set of lines is presented to the processor.

In a cache with a TLB, the critical timing path for a hit requires a sequence of four operations: 1) a virtual tag must be presented to a CAM in the TLB to determine the location of a corresponding physical tag in random access memory in the TLB; 2) the physical tag must then be retrieved from the TLB random access memory (RAM); 3) the physical tag from the TLB RAM must then be compared to physical tag's access from the tag section of the cache; and 4) the appropriate data line must be selected. The sequence of four operations required to read the cache and can be a limiter to processor frequency and processor performance.

SUMMARY

What is disclosed is a system for reducing latency of computer operations, including a first processing pipeline including a pre-validated translation lookaside buffer (TLB), the pre-validated TLB including a virtual address (VA) content addressable memory (CAM), wherein the VA CAM receives virtual address information for integer load operations; and a second processing pipeline, independent of the first processing pipeline, the second processing pipeline including a cache tag array that holds physical addresses of cache lines, a master TLB that receives virtual address information for store operations and generates a physical address, a bypass around the master TLB, wherein if the store address is a physical address, the physical address bypasses the second TLB, and a comparator that compares a physical address from one of the bypass and the master TLB to a physical address from the cache tag array, wherein if the physical addresses match, a cache way hit is generated.

DESCRIPTION OF THE DRAWINGS

The invention will be described with reference to the following drawings, wherein like numerals refer to like items, and wherein.

DETAILED DESCRIPTION

A cache having a TLB in which physical tags do not need to be retrieved from the TLB may improve the overall time for the critical path for accessing caches with TLBs. In such a design, instead of storing physical tags in a cache, the cache stores a location within the TLB where the physical tag is stored. The TLB may include two or more CAMs. For a cache hit, one of the CAMs in the TLB may generate a vector that specifies a location within the TLB where the physical address is stored. The vector may be compared to a location vector stored in the cache. The comparison of location vectors provides sufficient information to enable selection of one data line within a set without having to actually retrieve the physical address. As a result, a substantial time consuming operation (physical address retrieval) is removed from the critical time path of a cache hit. In addition, comparing location vectors rather than physical tags enables use of comparison logic that is faster and simpler than convention digital comparators.

Figure 1:
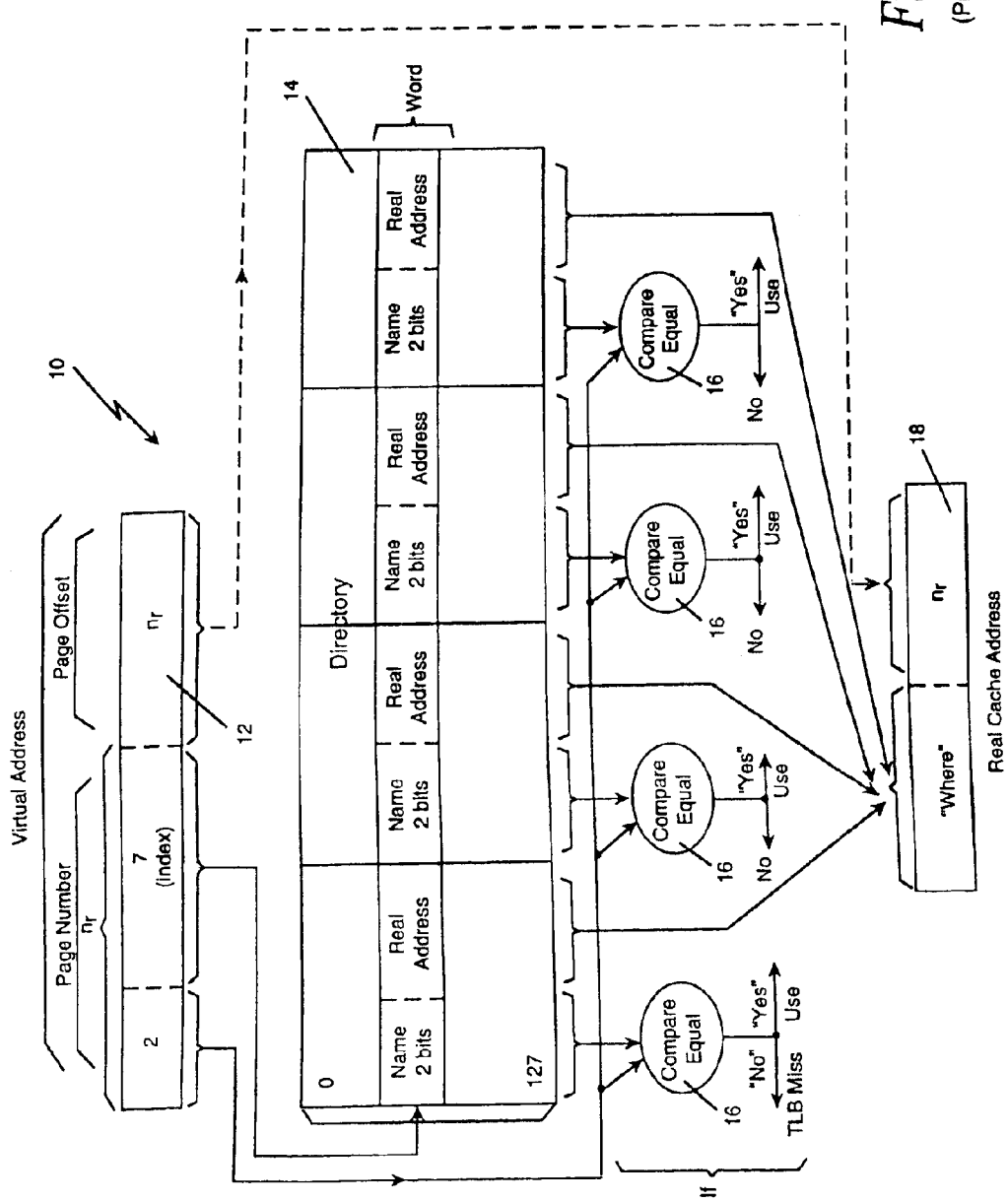
FIGS. 1 and 2 illustrate prior art cache micro-architectures.

FIG. 1 illustrates an example of a prior art cache. The system 10 includes a virtual address 12, a random access memory array 14, a comparator 16 and a physical address register 18. The system 10 employs set associative logic. The random access array 14 includes a total of 128 (four) entries requiring two virtual page address bits. Each set of four entries is part of one physical word (horizontal) of the random access array, so that there are 128 such words, requiring seven address index bits. The total virtual page number address n=9 must be used in the address translation to determine if and where the cache page resides. Lower order bits n, which represent the byte within the page, need not be translated. Seven virtual bits are used to select directly one of the 128 sets. Words read out of the set are compared simultaneously with the virtual addresses, using the comparator 16. If one of the comparisons gives a "yes," then the correct real or physical address of the page in the cache, which resides in the random access array, is gated to the physical cache-address register 18. The physical address is used on a subsequent cycle to obtain the correct information from the cache array (not shown).

Figure 2:
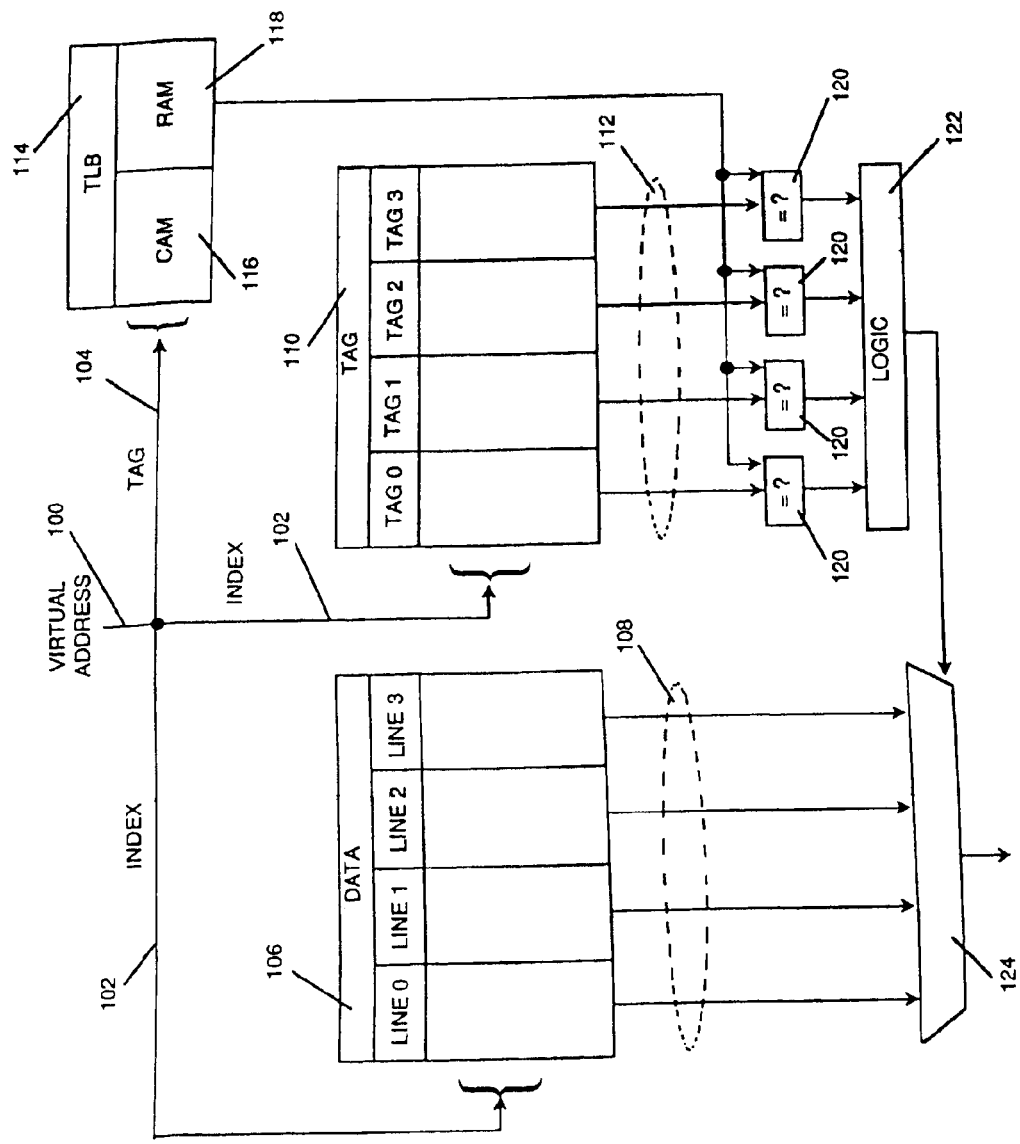

FIG. 2 illustrates another prior art cache. Four-way set-associative caches are used for illustration. A virtual address 100 comprises lower order index bits 102 and upper order (virtual) tag bits 104. The index bits 102 are typically the same for the virtual address and the physical address. The index bits 102 are used to select one set of lines of data in a data section 106 of the cache. The output of the data section 106 is four lines of data 108. The index bits 102 are also used to select a set of physical tags in a tag section 110 of the cache. The output of the tag section 110 is four physical tags 112, each corresponding to one data line 108. The virtual tag bits 104 are used to select one entry in a CAM 116 within a TLB 114. The TLB 114 stores both virtual and physical tags. If the virtual tag bits 104 do not find a match in the CAM 116, a TLB miss occurs. In the system shown in FIG. 2, multiple virtual tags may map to one physical tag. For a TLB hit, the selected CAM entry designates an address in a TLB RAM 118 for a physical tag corresponding to a virtual tag 104. A physical tag is then retrieved from the TLB RAM 118. Each of four digital comparators 120 then compares the physical tag from the TLB RAM 118 to a physical tag 112 from the tag section 110. A matching pair of physical tags indicates through logic 122 which of four lines of data is selected by a multiplexer 124. For a particular index bit, there may not be a matching pair of physical tags, in which case a cache miss occurs.

Figure 3:
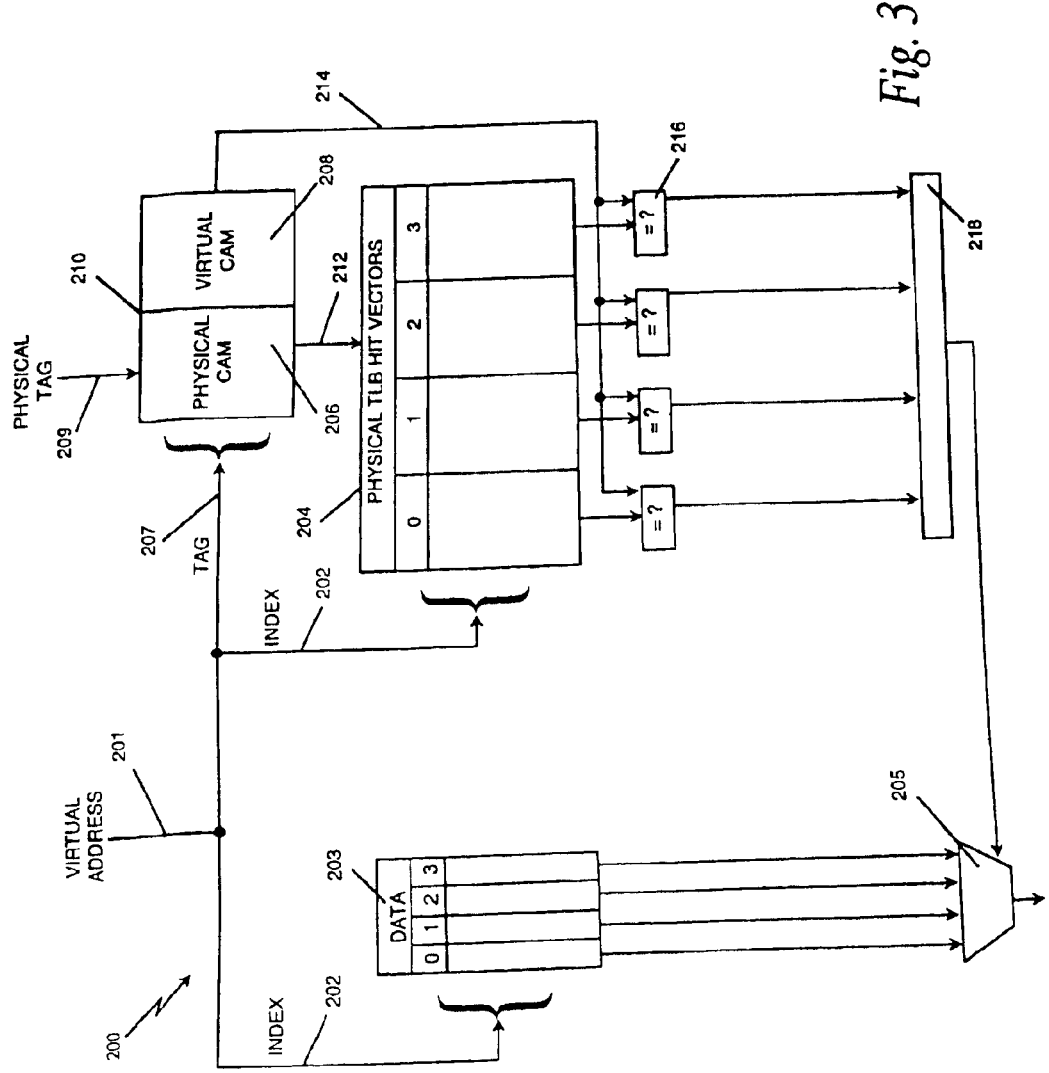
FIG. 3 is a block diagram of a prevalidated tag cache micro-architecture.

FIG. 3 illustrates a four-way set-associative cache 200. The cache 200 includes index bits 202, a data section 203 and multiplexer 205. A cache tag section 204 includes physical TLB hit tags corresponding to data lines. When a new line of data is placed in the cache 200, instead of the physical address tag being stored in the cache tag section 204, a vector 212 (called a physical TLB hit vector) is stored in the cache tag section 204.

In the cache 200, a TLB 210 has two CAMs, a physical CAM 206 containing physical tags and a virtual CAM 208 containing virtual tags. When a new virtual tag 207 is stored in the virtual CAM 208, a corresponding physical tag 209 is also available using the computer operating system and the corresponding physical tag 209 is stored in the physical CAM 206. A physical TLB hit vector 212 has a binary "1" corresponding to each location in the physical CAM 206 that has the physical tag 209. Upon entry of a new line into the cache 200, the physical TLB hit vector 212, indicating the location of all the instances in the physical CAM 206 of the physical tag 209 of the new line, is generated by the physical CAM 206 and stored into the cache tag section 204, at a row location determined by the index bits 202 and at a column location determined by a set placement algorithm.

For a cache access, a virtual tag 207 is used by the virtual CAM 208 to generate a virtual TLB hit vector 214. If there is a TLB miss, the virtual hit vector 214 is all binary "0s." If there is a TLB hit, the virtual TLB hit vector 214 has a single binary "1" indicating the location of the virtual tag 207 in the virtual CAM 208. Each virtual tag 207 in the TLB 210 must be unique.

For cache access, the index bits 202 select a set of four physical TLB hit vectors 212 in the cache tag section 204. Each of the four physical TLB hit vectors 212 in the cache tag section 204 is compared, using one of four comparators 216, to the virtual TLB hit vector 214 from the virtual CAM 208. For any given set of index bits 202, only one of the four selected physical tags in the cache tag section 204 matches the virtual TLB hit vector 214 from the TLB 210 for a fixed page size. For a fixed page size, a single pair of matching "1s" in the four physical TLB hit vectors 212 then determines which data line is selected by the multiplexer 205. For a given set of index bits 202, if there are no matching "1s" in the four physical TLB hit vectors 212, a cache miss occurs.

In the cache 200, the physical tag from the TLB 210 is not retrieved for cache access. Eliminating the operation of retrieving the physical tag from the TLB 210 eliminates an operation that takes a substantial amount of time in the critical time path for the cache access. Because the cache 200 looks for a pair of matching logical "1s" to determine a match, the comparators 216 may be simple AND gates followed by a large fan-in OR gate.

Additional details related to prevalidated cache architectures are provided in copending U.S. patent application Ser. No. 08/955,821, filed on Oct. 22, 1997, entitled CACHE MEMORY WITH REDUCED ACCESS TIME, now, U.S. Pat. No. 6,014,732, the disclosure of which is hereby incorporated by reference.

The micro-architecture illustrated in FIG. 3 includes a prevalidated tag cache. The prevalidation imposes restrictions on how the TLBs in the micro-architecture work if the computer micro-architecture is designed to maximize overall bandwidth while minimizing cache load latency. The prevalidated tag cache, for example, provides very fast access time for certain loads but the micro-architecture may be designed to restrict the translations between virtual and physical address and restrict the distribution of processing among the different cache levels. The micro-architecture may provide for fast integer loads and a high bandwidth for floating point loads, for example. That is, integer load data needs to have fast access timing but its working set size is generally small. To optimize integer load latency, some processors provide a small but fast first level cache. To provide virtual address translation and avoid address aliasing problems, some processors must access the TLB to provide a physical address for checking with the cache tags to determine if the data is present in the cache or not. To decrease the memory latency for fast integer data access, TLB size may be limited to a small number of entries (such as 16 to 32). This conflicts with the large number of entries required on processors with large cache structures that could require 256 or more TLB entries.

In a prevalidated cache tag system, such as that shown in FIG. 3, the TLB entries are logically used in the cache tag to identify the cache lines. When a TLB entry is removed, control is normally used to invalidate all the data in the prevalidated cache tag that is associated with the removed TLB entry. However, this action may slow processing since one TLB entry may map to much or all of the data cache. The TLB may then be continually swapping pages in and out of memory (i.e., thrashing) instead of supporting program execution.

Floating point data processing performance is usually limited by the memory bandwidth in and out of the floating point execution units. As opposed to integer load data accesses, which need a low latency, floating point accesses can usually be scheduled and can therefore endure a longer latency period. Likewise, while the integer data size is usually small, floating point data sets are usually very large. Ideally, TLB operations for floating point load/store operations will provide both high bandwidth and large data space translations (large number of TLB entries accessed). One design provides full bandwidth for all memory ports and a large but slower TLB for translation of floating point requests. In addition, memory port use may be unrestricted, allowing more load and store combinations.

The storing to or invalidating of a prevalidated integer load data cache may be difficult because the physical address of the cache line is not available in the cache tag, since the cache tag only holds prevalidated TLB hit information. In addition, since the TLB by its need for fast latency is small (e.g., 16 or 32 entries), the small integer load data cache TLB may not be used for store translations. One option is to separate out the store TLB access to a larger and slower TLB and provide a mechanism to invalidate the prevalidated integer load cache for store operations that may not be done in the first level cache (such as floating point stores) and for other invalidation actions such as flush caches and bus snoops.

Many computer instructions, such as floating point loads and stores, TLB support instructions, including purges, inserts and probes, and integer stores, do not need to immediately access a fast integer data cache. Some of the computer instructions may not have data residing in the fast integer load cache to avoid thrashing of the smaller cache. To support better use of the fast integer data cache, mechanisms may be provided to prevent this type of data from loading the integer data cache. To allow these instructions to bypass the integer cache, all exception information may be stored only in a large TLB so that the large TLB need only be accessed on, for example, all store operations, floating point loads, or TLB support instructions.

Finally, forcing all instructions through a first level TLB, which must be small to be fast, may cause pipeline stalls in the processor due to a higher TLB miss rate. Therefore, the micro-architecture shown in FIG. 3 may be adapted to use a parallel TLB structure that reduces the TLB miss rate and pipeline stalls.

The prevalidated cache tag system shown in FIG. 3 includes a prevalidated cache tag that contains tags holding bits that correspond to TLB entry slot numbers instead of holding physical or virtual addresses. To store into this type of cache and to invalidate the contents of this type of cache may be accomplished by the use of additional logic. The value of the prevalidated cache tag design is that load latency can be minimized. As a result, to maintain this load latency as low as possible, the design may avoid disrupting the load data path with store activities. In addition, cache stores may require physical address lookups and virtual address lookups. Adding these functions to the load data path might degrade load latency. By handling store operations in parallel with the load access path, load latency should remain unaffected. Likewise, store TLB entries can cause thrashing in the small, fast TLB used for the prevalidated tag cache. The store TLB operations may be handled in a parallel and noncritical structure.

In addition to parallel store operations, the system shown in FIG. 3 can be further optimized by invalidating cache lines that are to be removed from the prevalidated tag cache. The cache lines may be invalidated by communicating from the store/invalidate translation and lookup logic to the prevalidated cache tags to effectively invalidate each cache line. Cache tags in a prevalidated cache tag design may contain TLB hit bits rather than virtual or physical addresses. Therefore, when TLB entries change, cache lines associated with the TLB entry are invalidated. Additional logic can be added to the system shown in FIG. 3 to provide for invalidating the prevalidated cache tags for TLB changes.

If additional logic is added to the system shown in FIG. 3, cache lines may be invalidated due to a TLB change, but the cache lines may remain valid from the perspective of the store/invalidation control path. This situation does not cause problems for the load operations since load operations see the TLB invalidation effects. However, the situation can cause problems for stores and invalidations because stores and invalidations do not see the effects of the TLB invalidation. Another problem is encountered by potentially loading the same cache lines into multiple ways, or sections, of the prevalidated tag cache due to partial valid information because the cache line was already invalidated through a TLB update mechanism. This may reduce effectiveness of the cache by having redundant data in multiple ways, and may also cause problems for stores and updates. Stores may need to update more than one cache line to assure coherency. Invalidates may need to invalidate more than one cache line to assure coherency. A solution to the problem includes additional logic to remove stale cache lines from the prevalidated tag cache design shown in FIG. 3.

Figure 4:
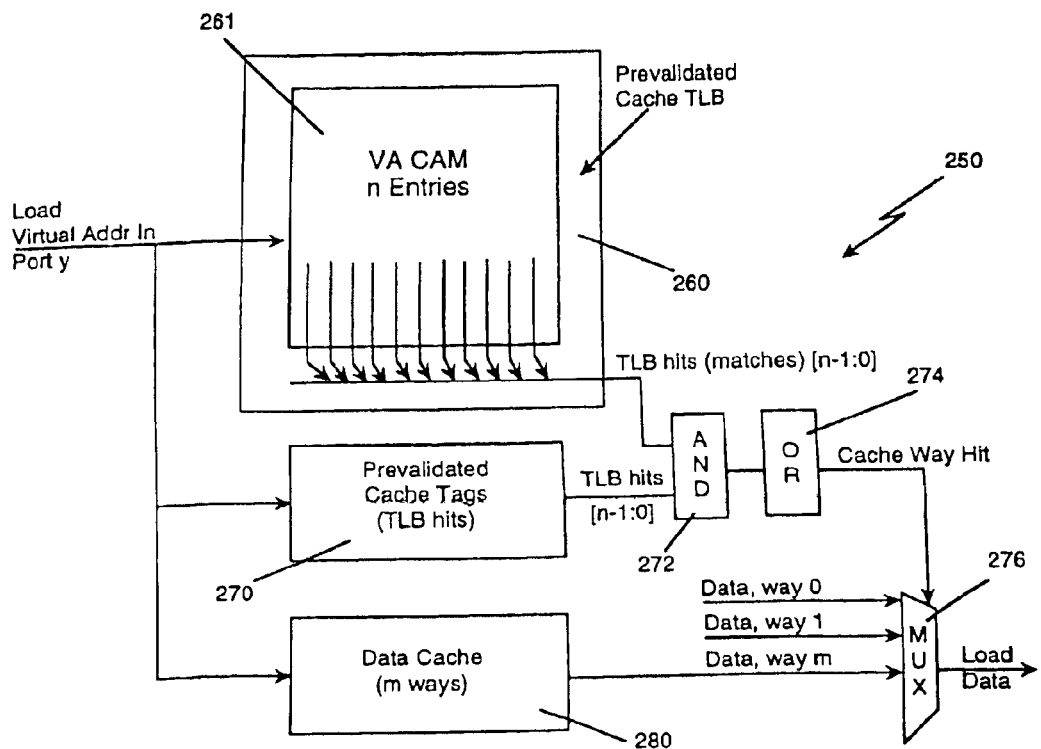
FIG. 4 is a block diagram of a prevalidated cache tag load data cache system.

FIG. 4 shows components of a prevalidated tag cache system 250 that is tuned for fast load latency. A small TLB 260 is provided with a virtual address (VA) CAM 261 that generates hit bits to a prevalidated cache tag. In parallel, the TLB hit bits that are stored in a prevalidated cache tag 270 are read according to an index field from an address generated by an instruction. The TLB hit bits from the VA CAM 261 and the prevalidated cache tag TLB hits are read and are ANDed and ORed in the AND circuit 272 and the OR circuit 274, respectively, to determine if a cache line is present in the cache. If a cache line is present in the cache, a cache way hit is generated and the output of the data cache 280 is multiplexed in multiplexer 276 to provide load data. Because the system 250 is tuned for fast virtual address load access, physically addressed loads can be supported by lower level cache accesses (not shown).

Figure 5:
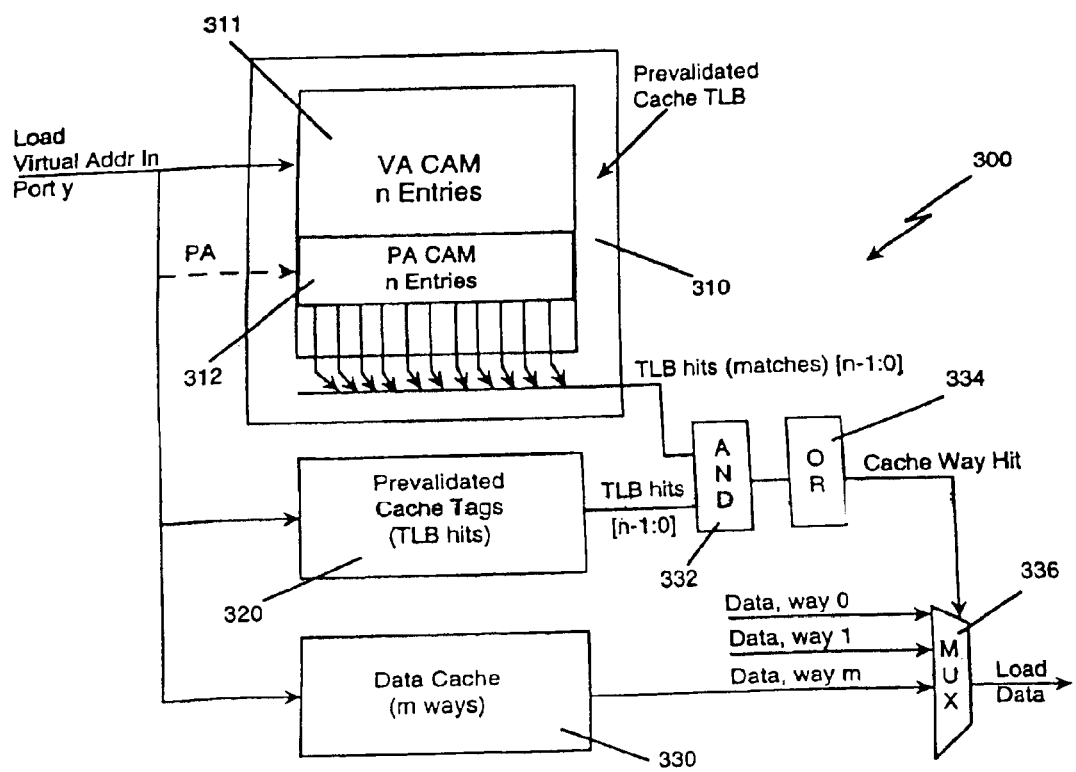
FIG. 5 is a block diagram of an expanded prevalidated cache system to cover store or invalidation operations in the prevalidated cache TLB.

Store updates can be supported by sending store instruction virtual address into the same address port as the loads. This operation will provide a cache way hit that would be used for a later store into the cache during a writeback pipeline stage. However, store instructions must be able to use physical addressing and either update or invalidate the existing cache line. FIG. 5 shows an expanded prevalidated cache system that is capable of handling the physical addressing of the store operations. The system 300 shown in FIG. 5 is similar to the system shown in FIG. 4. A prevalidated cache TLB 310 receives virtual addresses in memory port y and produces TLB hits. The prevalidated cache tag 320 produces TLB hits that are ANDed with the output of a VA CAM 311 and AND circuit 332 and are ORed in OR circuit 334 to produce a cache way hit. The cache way hit is used by multiplexer 336 to select the output of a data cache 330. The prevalidated cache TLB 310 includes a physical address CAM 312 so that physical address (PA) requests can be switched to the PA CAM 312 and the VA hit bits (now generated by a PA CAM) would compare with the tag as before. However, the addition of the PA CAM 312 to the prevalidated cache TLB 310 may adversely affect load access time. Further, store and invalidation TLB requirements may thrash the load TLB entries, causing more TLB misses and thus a lower TLB hit rate. Finally, store and invalidation operations take away from the load bandwidth provided by the prevalidated cache design, thereby reducing load operational bandwidth.

Figure 6:
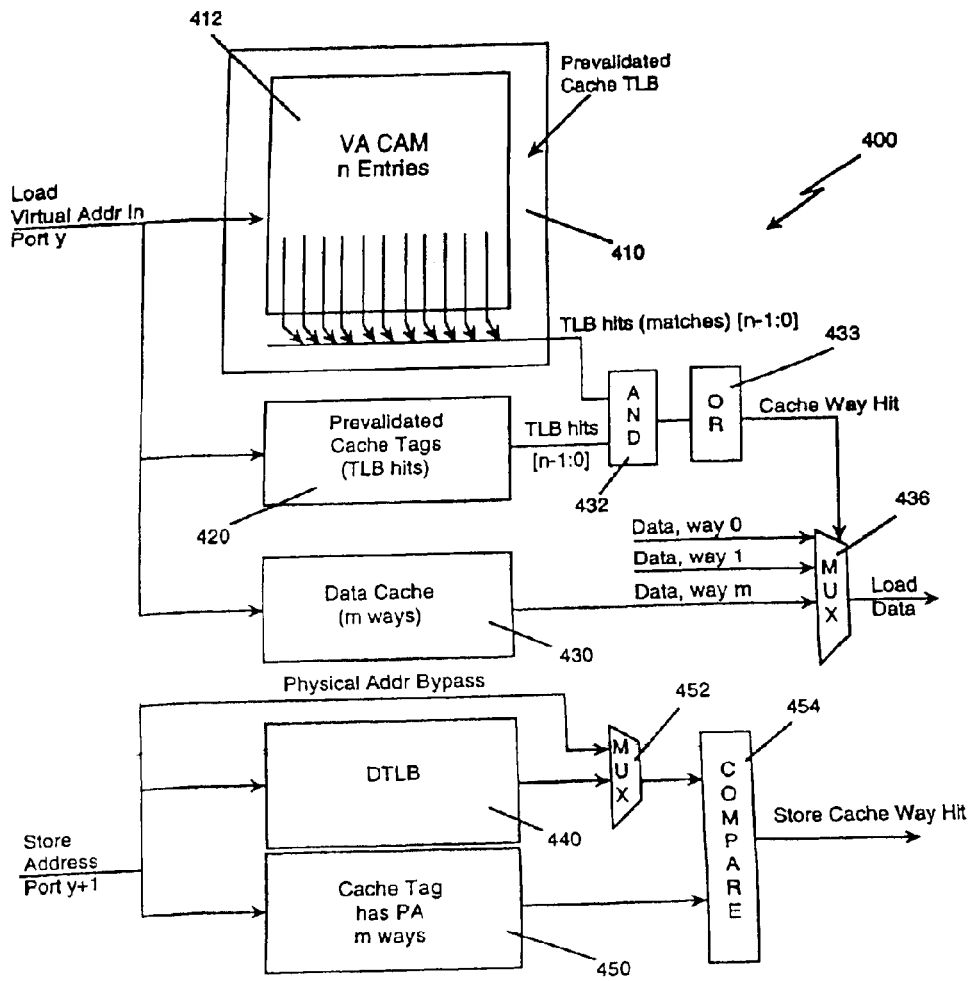
FIG. 6 is a block diagram of a prevalidated cache tag system with parallel store update.

The problems inherent in the system 300 shown in FIG. 5 can be overcome by the addition of a parallel TLB structure. FIG. 6 shows a prevalidated tag cache system 400 having such a parallel TLB structure. The system 400 includes a prevalidated cache TLB 410, including a VA CAM 412. As before, load virtual address information is provided in memory ports to the VA CAM 412 and to a prevalidated cache tag 420 and a data cache 430. The TLB hits from the VA CAM 412 compare to TLB hits from the prevalidated cache tags 420 and the cache way hit is used by multiplexer 436 to select the output of the data cache to provide load data.

A master TLB (DTLB) 440 is added in parallel with the prevalidated cache TLB 410. The DTLB 440 has a larger number of entries and is distinct from the prevalidated cache TLB 410. The DTLB 440 will hold all the TLB entries required for stores and other instructions. By not requiring the store and invalidation TLB entries to reside in the prevalidated cache 410, thrashing in the prevalidated cache TLB 410 is reduced.

A parallel cache tag array 450 may be added. The cache tag array 450 holds physical addresses of the cache lines. The cache tag array 450 is functionally in parallel with the prevalidated cache tags 420 that hold the TLB hit bits. A physical address cache tag is read out of the cache tag array 450 in the same manner as for the prevalidated cache tags, using an index contained in the input address. The addition of the DTLB 440 includes a new address pipeline that is independent of the load address pipeline. The addition of this pipeline provides greater bandwidth for the cache without impacting load access latency. In operation, the store addresses are inputted to the DTLB 440 and the cache tag array 450 independent of operations in the load data pipelines. If the store address is a physical address, the address is bypassed around the DTLB 440 and is inputted into a physical address multiplexer 452. If the store address is a virtual address, then the DTLB 440 is accessed and the physical address is translated by the DTLB 440. The physical address from the store instruction is then compared with the physical address read out of the cache tag array 450. If the two addresses match, then a way hit is generated and the store update hardware (not shown) will update or invalidate the data cache in a later pipeline stage.

Figure 7:
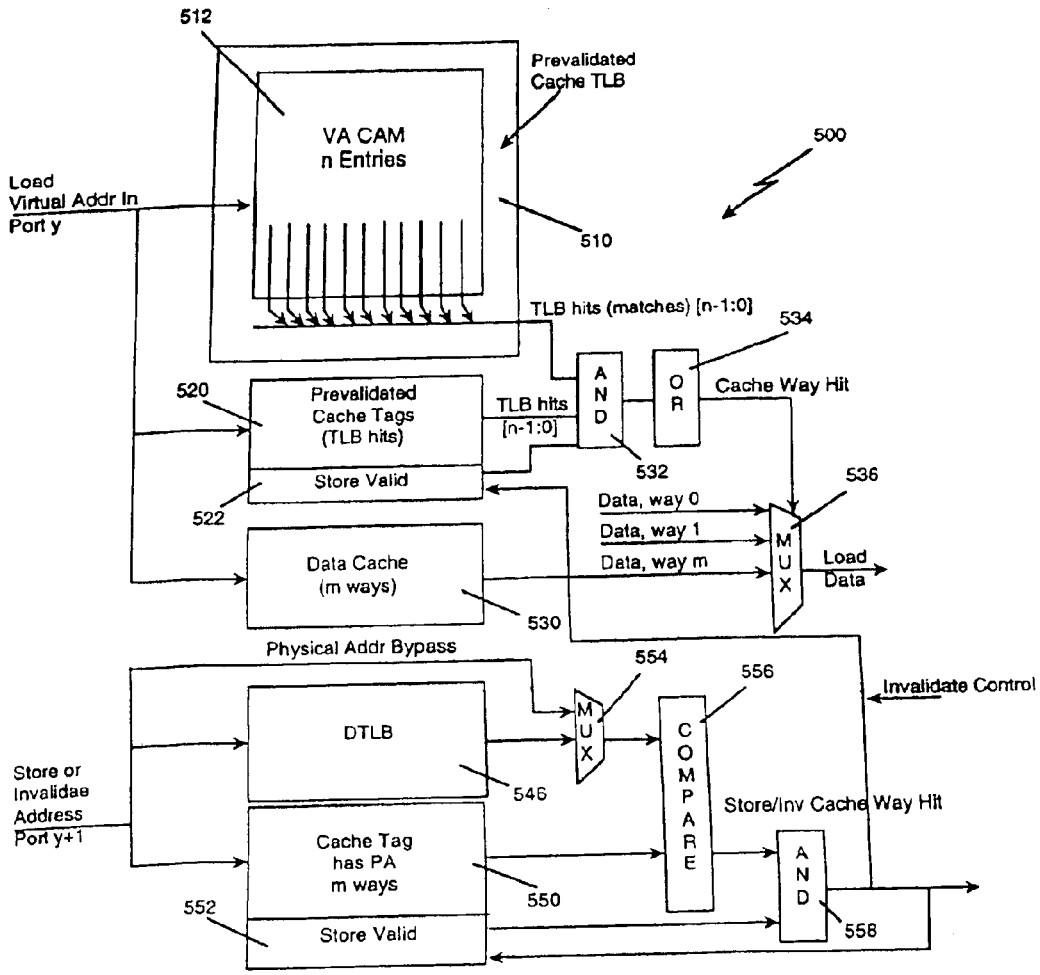
FIG. 7 is a block diagram of a prevalidated tag cache system with parallel store update and invalidation logic.

In addition to supporting store update operations, the system shown in FIG. 7 can accommodate invalidation of cache lines due to instructions or external requests by the addition of logic circuitry to carry out this function. Caches may need to be invalidated for many reasons, including eviction of a cache line from a processor due to a system bus request, eviction of a cache line from a processor due to a flush cache instruction, stores or read-modify-write operations that are supported at another level of the cache, and hardware failure recovery operations. Since the prevalidated cache is primarily used to produce load results with a fast latency, any invalidation process should only affect the cache way hit generation for load operations. To provide this functionality, a new structure may be added to the prevalidated cache tags to provide a single valid bit per cache line that is used to signal a cache line valid state. A store valid bit may be set when a new cache line is written and cleared only for an invalidation operation. Since the store valid bit is part of the load cache way hit control an invalidation will block load hits on that cache line.

FIG. 7 is a block diagram of prevalidated cache tag system 500 including additional logic for invalidation of a prevalidated cache tag. The system 500 includes a prevalidated cache TLB 510 having a VA CAM 512. A prevalidated cache tag 520 is also provided. Associated with the prevalidated cache tag 520 is a store valid module 522. A data cache 530 is also provided with the prevalidated cache TLB 510. The prevalidated cache TLB 510 receives load virtual address information in the memory port, such as port y and the VA CAM 512 executes compare operations to provide TLB hits. The prevalidated cache tag 520 also produces TLB hits read out of its memory. The output of the VA CAM 512 and the prevalidated cache tag are ANDed and ORed to produce a cache way hit, which is then used by the multiplexer 536 to select the output of the data cache 530.

An invalidation request is put on a store or invalidate address line (port y+1) and is translated in a DTLB 546 if it is a virtual address or bypassed around the DTLB 546 if the address is already a physical address. A cache tag array 550 is accessed and its physical address is compared with that of the store or invalidation instruction address. If the addresses match and the store valid bit for the cache tag array 550 is set, then a store/invalidate a cache way hit signal is generated out of the comparator network (556 and 558). The store/invalidate cache way hit will force the store valid bits in both the prevalidated cache tag 522 and the cache tag array 552 to be cleared for that cache line if an invalidation is required. Otherwise the hit information is used to update the data in the cache.

Figure 8:
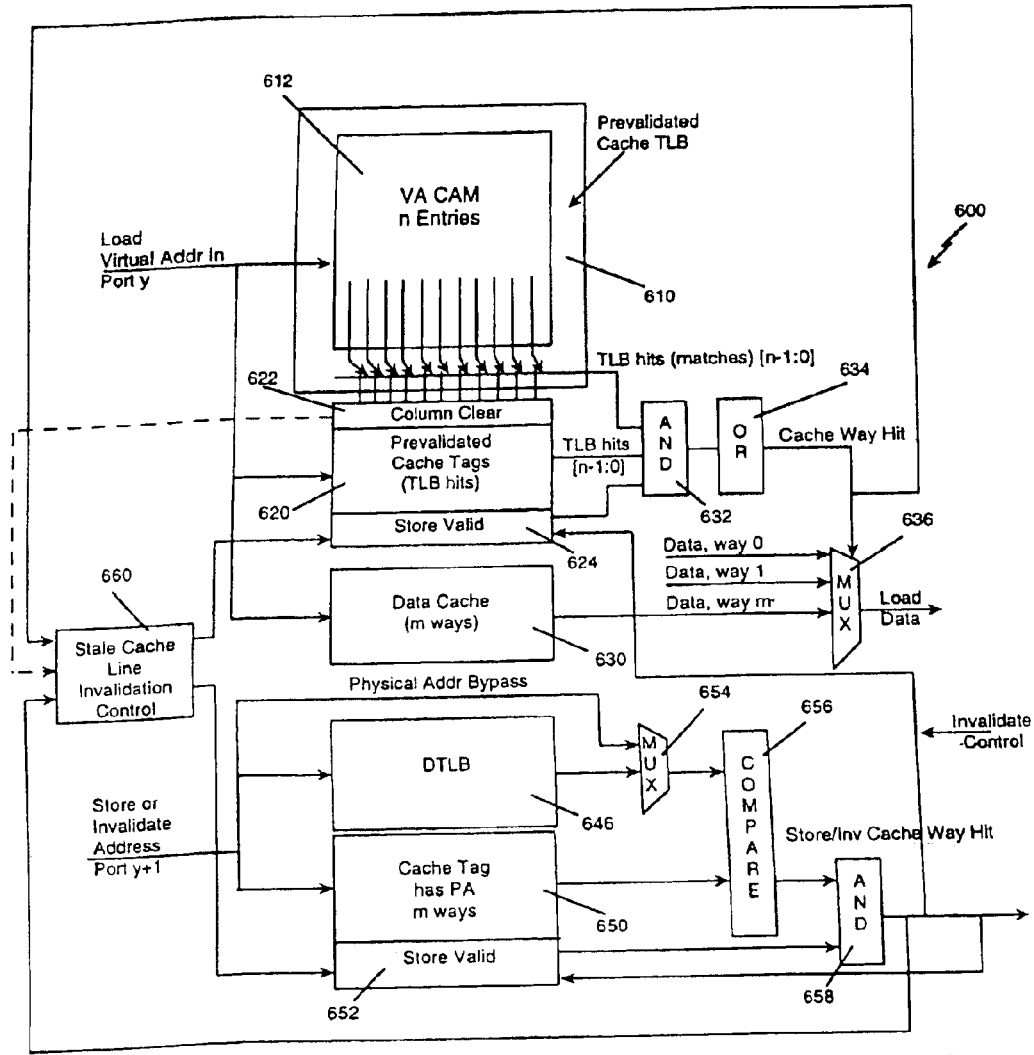
FIG. 8 is a block diagram of a prevalidated cache tag system with column clear logic and stale cache line removal logic.

The cache tags in a prevalidated cache tag design contain TLB hit bits rather than virtual or physical addresses. Therefore, when TLB entries change, all cache lines associated with the TLB entry may be invalidated. This invalidation may be accomplished by the addition of a logic circuit to the prevalidated cache tags. FIG. 8 shows a prevalidated cache tag system 600 including the additional logic circuit to provide for cache line invalidation when TLB entries change. As before, a prevalidated cache TLB 610 includes a VA CAM 612, a prevalidated cache tag 620 and a data cache 630. The prevalidated cache tag 620 includes a store valid module 624 and a column clear module 622. The output of the VA CAM 612 and the prevalidated cache 620 are ANDed in AND circuit 632 and ORed in OR circuit 634 to produce a cache way hit, which is used by the multiplexer 636 to select the data cache 630 output. The column clear module 622 will clear all n bits of the prevalidated cache tag for one or more TLB slot entry positions.

Also included in the micro-architecture 600 is a parallel, master TLB (DTLB) 646, a physical address cache tag 650 and a store valid bit module 652. The DTLB 646 and the physical address cache tag 650 function in a manner similar to the DTLB 440 and the cache tag array 450 shown in FIG. 6. A multiplexer 654, comparator 656 and AND circuit 658 receive outputs from the DTLB 646, the physical address cache tag 650 and the store valid bit module 652 and a physical address bypass to produce a store/invalidate cache way hit.

When a new prevalidated cache TLB entry is inserted, meaning that the TLB entry that was previously in a TLB slot has been invalidated, or whenever a TLB entry is invalidated for other reasons, such as aliasing or TLB maintenance instructions, the column clear module 622 operates. In these cases, the TLB 610 will set TLB hit bits for all TLB slots that are to be invalidated (several TLB entries may be invalidated during one cycle). The prevalidated cache tag 620 will receive a column clear control signal and will look at the TLB hit signals from the prevalidated cache TLB 610 and will clear all the TLB hit bits in the prevalidated cache tag 620 for the TLB slots that are indicated. This operation may invalidate one or many cache lines.

The micro-architecture shown in FIG. 8, and discussed above, will function to invalidate prevalidated cache tags, but will not invalidate physical address cache tags. Stale cache lines are cache lines that are invalidated by a column clear, but remain valid for the store/invalidation ports (the store valid bits 624, 652). The stale cache lines may be removed by a hardware cleansing function performed after each TLB insert or purge. This function would walk through the indexes of the cache tags and would check each index for an invalid entry in the prevalidated cache tags and a valid entry in the physical address cache tags. If such a condition was found, then the store valid bits (624, 652) would be cleared for that entry.

Alternatively, hardware may be provided to invalidate the store valid bits whenever a TLB bit in the prevalidated cache tags is cleared due to a column clear operation. This would require detection of a column clear function. This function may also require ORing the multiple bits (up to m) due to the fact that multiple TLB slots can be cleared during one cycle. In addition, this function would also require connecting this information to each index row of the store valid bits in both the prevalidated cache tag and the physical address cache tag. This method could impose significant wiring complexity.

To minimize wiring complexity, the cleansing operations may be performed on one index location at a time when that index is being loaded with a new cache line. A stale cache line control 660 may be added to the micro-architecture 600 to clear stale cache lines. The stale cache line control 660 receives cache way hit information and optionally column clear information and provides signals to the store valid bit modules 624, 652. When a cache line fill (i.e., loading the cache with a new cache line) is being processed in the cache, the address of that cache line is sent through the physical address cache tag 650 to determine if the cache line is stale in any of the cache ways that are not being loaded with the new line. If there is a hit on any of the other cache ways, then such a hit means that the same cache line being filled is also residing in an other cache way as a stale line. When this condition is detected, the stale cache line control 660 will invalidate the stale cache line as it would a normal invalidation operation, by clearing the store valid bits in both the store valid bit modules 624 and 652.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed:

1. A system for reducing latency or computer operations, comprising:
   a first processing pipeline comprising a prevalidated cache translation lookaside buffer (TLB), the prevalidated cache TLB comprising virtual address (VA) content addressable memory (CAM), wherein the VA CAM receives virtual address information for integer load operations; and
   a second processing pipeline, independent of the first processing pipeline, the second processing pipeline comprising:

a cache tag array that holds physical addresses of cache lines, a master TLB that receives virtual address information for store operations and generates a physical address, a bypass around the master TLB, wherein if a store address is a physical address, the physical address bypasses the master TLB, and a comparator that compares physical address from one of the bypass and the master TLB to a physical address from the cache tag array, wherein if the physical addresses match, a store/invalidate cache way hit is generated.

2. The system of claim 1, wherein the first processing pipeline further comprises:
a data cache;
prevalidated cache tag array; and
a logic circuit at the output of the VA CAM and the prevalidated cache tag array to produce a cache way hit.

3. The system of claim 2, wherein the first processing pipeline further comprises a multliplexor that uses the cache way hit to select a data cache output.

4. The system of claim 1, wherein the first processing pipeline further comprises a column clear module that clears TLB hit bits of a prevalidated cache tag array for one or more TLB slot entry positions.

5. The system of claim 1, wherein the prevalidated cache TLB sets TLB hit bits for all TLB slots to be invalidated.

6. The system of claim 1, further comprising a hardware cleansing function that removes stale cache lines after each prevalidated cache TLB insert or purge, wherein the function:
compares each cache tag index that has an invalid entry in a prevalidated cache tag array with a valid entry in a physical address cache tag array; and
clears each physical address cache tag when the comparison results in a match.

7. The system of claim 1, further comprising:
an apparatus to invalidate store valid bits whenever a TLB bit in a prevalidated cache tag array is cleared due to a column clear operation, wherein the apparatus,
detects a column clear function;
ORs the multiple bits; and
compares each bit invalidated in the prevalidated cache tag array to each index row of the store valid bits in both the prevalidated cache tag array and the physical address cache tag array.

8. The system of claim 1, further comprising:
a stale cache line control to invalidate store valid bits on one index location when an index is being loaded with a new cache line, wherein the stale cache line control:
receives cache way hit information and, optionally, column clear information;
provides signals to a store valid bit module located in both the first processing pipeline and the second processing pipeline;
sends the address of a cache line that is being processed in a cache line fill through the physical address cache tag;
determines if the cache line is stale in any of the cache ways that are not being loaded with the new cache line whenever there is a hit on any of the other cache ways;
invalidates the stale cache line; and
clears the store valid bits in both store valid bit modules.

9. A method for reducing latency of computer operations, comprising:
running a first processing pipeline wherein the first processing pipeline receives virtual address information for integer load operations from a pre-validated cache TLB with a VA CAM; and running a second processing pipeline, independent of the first processing pipeline, wherein the second processing pipeline
holds physical addresses of cache lines in a physical address cache tag array
receives address information for store operations in a master TLB, wherein the master TLB generates a physical address;
bypasses around the master TLB if the store address information is a physical address;
compares the physical address from one of the bypass and the master TLB to a physical address from the physical cache tag array; and
generates a cache way hit if the physical addresses match.

10. The method of claim 9, further comprising:
clearing entries from a prevalidated cache tag array for one or more prevalidated cache TLB slot entry positions.

11. The method of claim 9, further comprising:
invalidating prevalidated cache tags by:
setting prevalidated cache TLB hit bits for all prevalidated cache TLB slots that are to be invalidated;
receiving a column clear signal by a prevalidated cache tag array; and
clearing all prevalidated cache TLB hit bits in the prevalidated cache tag array for all TLB slots indicated by the TLB hit signals.

12. The method of claim 9, further comprising:
removing cache lines that are invalidated by a column clear but remain valid for a stale cache line by:
comparing each cache tag index that has an invalid entry in a prevalidated cache tag array with a valid entry in the physical address cache tag array, and
clearing each physical address cache tag when the comparison results in a match.

13. The method of claim 9, further comprising:
detecting a column clear function;
connecting the column clear function information to each index row of store valid bits in both a prevalidated cache tag array and the physical address cache tag array.

14. The method of claim 13, further comprising OR-ing multiple store valid bits.

15. The method of claim 9, further comprising:
removing stale cache lines by
receiving cache way hit information and optionally column clear information;
providing signals to a store valid bit module located within the first processing pipeline and the second processing pipeline;
sending an address of a cache line that is being processed through the physical address cache tag array;
determining if the cache line is stale in any of the cache ways that are not being loaded with the new cache line whenever there is a hit on any of the other cache ways; and
invalidating the stale cache line and clearing the store valid bits in the store valid bit modules located in the first processing pipeline and the second processing pipeline.

* * * * *

UNITED STATES PATENT AND TRADEMARK OFFICE
CERTIFICATE OF CORRECTION

PATENT NO. : 6,920,531 B2  Page 1 of 1
APPLICATION NO. : 10/699666
DATED : July 19, 2005
INVENTOR(S) : Terry L Lyon It is certified that error appears in the above-identified patent and that said Letters Patent is hereby corrected as shown below:

In column 10, line 57, in Claim 1, delete "or" and insert -- of --, therefor.

In column 10, line 61, in Claim 1, after "comprising" insert -- a --.

In column 11, line 8, in Claim 1, after "compares" insert -- a --.

In column 11, line 19, in Claim 3, delete "multliplexor" and insert -- multiplexor --, therefor.

In column 11, line 38, in Claim 7, delete "apparatus," and insert -- apparatus: --, therefor.

In column 12, line 5, in Claim 9, after "pipeline" insert -- : --.

In column 12, line 7, in Claim 9, after "array" insert -- ; --.

In column 12, line 50, in Claim 15, after "by" insert -- : --.

Signed and Sealed this

Eleventh Day of August, 2009

David J. Kappos
*Director of the United States Patent and Trademark Office*